United States Patent
Usova et al.

(10) Patent No.: US 8,420,578 B2
(45) Date of Patent: Apr. 16, 2013

(54) LOW-DENSITY CERAMIC PROPPANT AND ITS PRODUCTION METHOD

(75) Inventors: Zinaida Yurievna Usova, Tomsk (RU); Elena Mikhailovna Pershikova, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 473 days.

(21) Appl. No.: 12/100,513

(22) Filed: Apr. 10, 2008

(65) Prior Publication Data

US 2008/0261837 A1 Oct. 23, 2008

(30) Foreign Application Priority Data

Apr. 20, 2007 (RU) ................. 2007114804

(51) Int. Cl.
*E21B 43/16* (2006.01)
(52) U.S. Cl.
USPC ........... 507/271; 166/305.1; 264/15; 264/215
(58) Field of Classification Search ................. 507/271; 166/305.1; 264/15, 215
See application file for complete search history.

(56) References Cited

U.S. PATENT DOCUMENTS

| | | | |
|---|---|---|---|
| 4,632,876 A * | 12/1986 | Laird et al. | 428/404 |
| 4,923,714 A * | 5/1990 | Gibb et al. | 427/221 |
| 4,944,905 A | 7/1990 | Gibb et al. | |
| 6,372,678 B1 * | 4/2002 | Youngman et al. | 501/128 |
| 6,582,819 B2 | 6/2003 | McDaniel et al. | |
| 6,632,527 B1 | 10/2003 | McDaniel et al. | |
| 2006/0016598 A1 | 1/2006 | Urbanek | |

FOREIGN PATENT DOCUMENTS

| | | |
|---|---|---|
| CA | 1251223 A1 | 3/1989 |
| CN | 1844298 A | 10/2006 |
| RU | 2180397 C1 | 3/2002 |
| RU | 2267010 C1 | 12/2005 |
| WO | WO 2006/034298 | 3/2006 |

OTHER PUBLICATIONS

Mineral Photos-Perlite, Mineral Information Institute www.mii.org/minerals/photoperlite.html Printed Nov. 8, 2011.*
Vermiculite, Naturally occuring, safe, and plentiful, Vermiculite homepate for information about vermiculite, www.vermiculite.net Printed Nov. 8, 2011.*
Office Action of Chinese Patent Application Serial No. 200880004784.8 dated Jun. 5, 2012: pp. 1-3.
International Search Report of PCT Application No. PCT/RU2008/000247 dated Sep. 18, 2008: p. 1.
Examination Report of Canadian Patent Application Serial No. 2678155 dated Mar. 9, 2011: pp. 1-2.

* cited by examiner

*Primary Examiner* — Alicia Toscano
(74) *Attorney, Agent, or Firm* — Jeremy D. Tillman; Daryl Wright; Robin Nava

(57) ABSTRACT

A low-density ceramic proppant is formed from a light aggregate of a natural mineral and a ceramic binding material in the form of a proppant granule. The light aggregate expands in volume when burnt so that the density of the aggregate is changed. A method of preparing a proppant material is carried out by pre-crushing and pre-mixing of raw components. This is followed by their granulation into proppant granules, drying and screening of the granules to a selected size. The raw components include at least a ceramic binding material and a light aggregate of a natural mineral that, when burnt, expands in volume so that the specific volume of the aggregate is changed. The burning of the light aggregate may be accomplished before or after the aggregate is mixed with the binding material.

13 Claims, No Drawings

LOW-DENSITY CERAMIC PROPPANT AND ITS PRODUCTION METHOD

This application claims foreign priority benefits under 35 U.S.C. §119(a)-(d) to Russian Patent Application No. RU 2007114804, filed Apr. 20, 2007, which is herein incorporated by reference.

FIELD OF THE INVENTION

The invention relates to the area of oil and gas industry and can be used for enhancement of the oil and gas production, in particular, when using hydraulic fracturing techniques.

BACKGROUND

The statements in this section merely provide background information related to the present disclosure and may not constitute prior art.

In the oil production technology based on the use of the hydraulic fracturing methods, the well production is enhanced by injecting proppant granules into fractures made in an oil-bearing formation, in order to fix the position of the fracture walls, thus preventing them from closing. The proppant is injected into fractures by pumping a proppant-containing fracturing fluid under high pressure. It has been experimentally established that a lower apparent density allows a more uniform distribution of the proppant and increases the oil and gas production levels.

In International Publication No. WO 2006/034298, proppant granules are described as coated particles made of an inorganic material which is a mixture of quartz and alumina taken at a ratio of approximately 2.2:5 and having a bulk density less than or approximately equal to 1 g/cm$^3$. This reference also describes an underground formation treatment method, according to which a fracturing fluid is injected into an underground formation, and the fracturing liquid contains inorganic particles consisting of quartz and alumina at a ratio of approximately 2.2:5, and the inorganic material has an apparent density less than or approximately equal to 1 g/cm$^3$.

U.S. Pat. No. 6,582,819 describes composite particles that are based on a binder and a filler and are suitable for use in the hydraulic fracturing technique. The filler may contain two or more different materials. The binder usually consists of a polymeric material, possibly, with cement added. The resulting composite particles have a bulk density varying from 0.5 to 1.30 g/cm$^3$ and can be used as a proppant in the oil and gas production industry, as well as for filtration of water and for production of synthetic grass for sports grounds. The methods of production of the composite particles are also described.

U.S. Pat. No. 6,632,527 also describes composite particles that are based on a binder and a filler and are suitable for use in the hydraulic fracturing technique. The filler is usually a fine mineral substance to which fibrous materials can be added. Apart from the hydraulic fracturing technique, the particles can be used for filtration of water and for production of synthetic grass for sports grounds. Methods of production of the composite particles are also described.

The prior-art proppants show a lack of efficiency in the hydraulic fracturing technique. Accordingly, new proppants and methods of forming proppant materials are needed.

SUMMARY

A low-density ceramic proppant is formed from a light aggregate of a natural mineral and a ceramic binding material in the form of a proppant granule. The light aggregate expands in volume when burnt so that the density of the aggregate is changed. In certain embodiments, the natural mineral is selected from at least one of vermiculite, pearlite, hydromicas, natural zeolites, aggloporite and expanded clay and the light aggregate content in the proppant granule may not exceed 80 wt %. The proppant granule may have a density of from 2.65 g/cm$^3$ or less.

In certain embodiments the light aggregate may be pre-coated with an organic or inorganic coating before it is combined with the binding material.

The binding materials may include clays, kaolins, bauxites or combinations of these. Additionally, the binding material may also include alumina, metallurgical-grade slags, phenol-formaldehyde resins, aluminum, bronze or their combinations.

A method of preparing a proppant material is also provided and involves pre-crushing and pre-mixing of raw components. This is followed by granulation of the mixed raw components into proppant granules, drying and screening the granules to a selected size. The raw components may include a ceramic binding material and a light aggregate of a natural mineral that, when burnt, expands in volume so that the specific volume of the aggregate is changed. The light aggregate may be burnt prior to the mixing stage to provide the volume change or may be burnt subsequent to mixing.

DETAILED DESCRIPTION

The description and examples are presented herein solely for the purpose of illustrating the various embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

The present invention is directed towards ceramic granules which may be used as proppant particles. The proppant particles having a low density of less than 2.65 g/cm$^3$. In certain embodiments that proppant particles may have a density of 2.6 g/cm$^3$ or less. The proppant particles may be used in hydraulic fracturing techniques to enhance the production of a wells formed in subterranean formations, such as those in the production of hydrocarbon fluids.

The proppant may be in the form of spherical and/or angular particles having a low apparent density of 2.65 g/cm$^3$ or 2.6 g/cm³ or less and consists of a light aggregate, which may be referred to as a "filler," and a binding material, which may be referred to as a "binder."

The light aggregate is a natural mineral which, when burnt, may form a new phase in the proppant granule and/or change the specific volume of the light aggregate. Examples of such materials include vermiculite, pearlite, hydromicas and natural zeolites. Additionally, the natural mineral may be provided as particles already having low density or porous structure, such as pumice materials. Such materials may have already undergone burning or extreme heating under natural conditions to provide such low density or change of phase.

In certain instances, the light aggregate may be pre-coated with an organic or inorganic (including metal) coating (e.g. silicon, dextrin, silicate glass, epoxy resins or their compositions), in order to improve the molding properties and the end-use properties of the material.

It is possible to use combinations of different types of light aggregates. In particular, at least one of vermiculite, aggloporite, expanded clay, pearlite, synthetic and natural zeolites may be used at different weight ratios. All or some of these light fillers can be pre-coated. The light filler content in the finished product may be below 80 wt %, and is usually from about 10 to about 40 wt %, and depends on the physical properties of the fillers themselves, as well as on the requirements imposed on the resulting proppant granules.

The binding materials used are organic, inorganic or metal powders, such as bauxites, kaolins, clays, alumina, metallurgical-grade slags, phenol-formaldehyde resins, aluminum, bronze or their combinations.

In certain instances, the filler material, which may not have been previously heat-treated can be added, along with other components, to a base material, and the mixture granulated and burnt. The filler material may be pre-treated with different substances. In particular, the filler may be pre-treated with hydrogen peroxide or with a number of phosphate binders, such as $H_3PO_4$, an aluminum-chromium-phosphate binder, an aluminum-boron-phosphate binder, an aluminum-boron-phosphate concentrate, potassium-ion-containing salts, as well as with a number of ammonium salts and nitrate salts, in order to intensify the phase formation process and to reduce its temperature.

The developed proppant granule production method includes pre-crushing and pre-mixing of the various raw components, followed by their granulation, drying and screening to size. In this method, at least the ceramic binder and the light aggregate filler material are used as the raw components. The light aggregate is at least one natural mineral which is able, when burnt, to form a new phase in a proppant granule and that changes its apparent density due to volume changes caused to the filler by heat treatment.

According to one embodiment of this method, a previously heat-treated filler or a mixture of different fillers is added, along with other components, to the base material, and the mixture is then granulated and burnt.

In another embodiment, when using two or more additives, one or more previously heat-treated fillers are mixed with the ceramic binding material and with other components, while the remaining fillers are added to the binding material without being heat-treated, and the mixture is then granulated and burnt.

The proppant particles formed in accordance with the invention may have an average particle size of from less than about 0.15 mm to about 2.5 mm or more. The proppant may be used in a carrier fluid in any amount sufficient to provide the desired propping function.

In use, the proppant particles are combined with a carrier fluid that is then introduced into a well bore of a subterranean formation. The carrier fluid containing the proppant particles may be introduced into the formation at a pressure above the fracture pressure of the formation. The carrier fluid may be any carrier fluid, such as those that are well known to those skilled in the art. The carrier fluid may be a viscosified or non-viscosified fluid.

The following examples serve to further illustrate the invention

EXAMPLES

Example 1

A mixture consisting of 25% of kaolin and bauxite were added to pre-expanded clay having a porosity of 75% and an average particle size of about 40 mesh. The ratio of kaolin to bauxite in the mixture was 80 to 20 wt %, respectively. The resulting mixture was granulated in an Eirich-type mixer, with a 5% solution of polyvinyl alcohol added thereto in the amount of 10 vol % of the volume of the material granulated. The total granulation time was equal to 4 minutes, out of which 1 minute constituted the nucleation time and 3 minutes constituted the granule growth time. The resulting granulated material was dried in a desiccator at temperature of 100° C. and was then burnt at a temperature of 1,350° C. at a rate of 3° C. per minute and was held at the final temperature for 2 hours. The resulting proppant was 20/40 mesh in size and exhibited a density of 1.75 g/cm³ and a crushing strength of 5 wt % at 5,000 psi.

Example 2

Raw vermiculite powder was pre-coated with an aluminum-chromium-phosphate binder at a ratio of 9 to 1. The resulting mixture was mixed in a mixer for 2 minutes. 90% of kaolin clay was added thereafter to the resulting pulp in addition to 100% and granules were rolled. The resulting granulated material was dried, burnt at a temperature of 1,350° C. and then screened to size. The resulting proppant was 20/40 mesh in size and had a density of 2.3 g/cm³ and a crushing strength of 5 wt % at 7,500 psi.

Example 3

Raw vermiculite powder was pre-coated with an aluminum-chromium-phosphate binder at a ratio of 9 to 1. The resulting mixture was mixed in a mixer for 2 minutes. 70% of kaolin clay was added thereafter to the resulting pulp in addition to 100% and granules were rolled and 30% of expanded clay was added. The resulting granulated material was dried, burnt at a temperature of 1,350° C. and then screened to size. The resulting proppant was 20/40 mesh in size and showed a density of 2.0 g/cm³ and a crushing strength of 6 wt % at 5,000 psi.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A ceramic proppant precursor comprising a light aggregate of a natural mineral and a ceramic binding material in the form of a proppant granule, wherein the light aggregate is a natural mineral selected from at least one of vermiculite, perlite, hydromicas, natural zeolites, aggloporite and expanded clay, and whereby the light aggregate expands in volume when burnt so that the density of the aggregate is decreased, wherein the light aggregate content in the proppant granule is greater than about 25 wt %, but does not exceed 80 wt %.

2. The proppant precursor according to claim 1, wherein the natural mineral is selected from at least one of vermiculite and expanded clay.

3. The proppant precursor according to claim 1, wherein the light aggregate content in the proppant granule is greater than about 25 wt % and less than about 40 wt %.

4. The proppant precursor according to claim 1, wherein the light aggregate is pre-coated with an organic or inorganic coating before it is combined with the binding material.

5. The proppant precursor according to claim 1, wherein clays, kaolins, bauxites or combinations of these are used as the binding material.

6. The proppant precursor according to claim 5, wherein the binding material further comprises alumina, metallurgical-grade slags, phenol-formaldehyde resins, aluminum, bronze or their combinations.

7. A ceramic proppant precursor comprising a light aggregate of a natural mineral and a ceramic binding material in the form of a proppant granule, wherein the light aggregate expands in volume when burnt so that the density of the aggregate is changed, and whereby the light aggregate is a natural mineral selected from at least one of vermiculite, perlite, hydromicas, natural zeolites, aggloporite and expanded clay, wherein the light aggregate content in the proppant granule is greater than about 25 wt %, but does not exceed 80 wt %.

8. A method of preparing a proppant material, the method comprising: pre-crushing and pre-mixing of raw components include at least a ceramic binding material and a light aggregate of a natural mineral; granulating the raw materials into proppant granules; drying and screening to a selected size; whereby the light aggregate is a natural mineral selected from at least one of vermiculite, perlite, hydromicas, natural zeolites, aggloporite and expanded clay, and expanding the proppant material in volume so that the specific volume of the aggregate is decrease when burnt during the preparation method, wherein the light aggregate content in the proppant granule is greater than about 25 wt %, but does not exceed 80 wt %.

9. The method according to claim 8, wherein the light aggregate content in the proppant granules is greater than about 25 wt % and less than about 40 wt %.

10. The method according to claim 8, wherein the light aggregate is pre-coated with an organic or inorganic coating before it is combined with the binding material.

11. The method according to claim 8, wherein clays, kaolins, bauxites or combinations of these are used as the binding material.

12. The method according to claim 11, wherein the binding material further comprises alumina, metallurgical-grade slags, phenol-formaldehyde resins, aluminum, bronze or their combinations.

13. The method according to claim 8, wherein:

the proppant granules have a density of from 2.65 $g/cm^3$ or less.

* * * * *